United States Patent [19]

Weir, III

[11] Patent Number: 4,712,812

[45] Date of Patent: Dec. 15, 1987

[54] UNIVERSAL FITTINGS

[76] Inventor: Joseph W. Weir, III, 311 E. Forsythia St., Ore City, Tex. 75683

[21] Appl. No.: 902,790

[22] Filed: Sep. 2, 1986

[51] Int. Cl.[4] .............................................. F16L 25/00
[52] U.S. Cl. ..................................... 285/177; 285/906;
138/96 T
[58] Field of Search ................ 285/12, 177, 404, 417, 285/175, 156, 901, 906; 174/65 R; 138/96 T, 89

[56] References Cited

U.S. PATENT DOCUMENTS

| 255,163 | 3/1882 | Goldschmid | 285/177 X |
| 831,588 | 9/1906 | Wood | 285/177 |
| 980,245 | 1/1911 | Goodall | 285/177 X |
| 2,159,811 | 5/1939 | Leonardo | 285/12 |
| 4,266,813 | 5/1981 | Oliver | 285/177 X |

FOREIGN PATENT DOCUMENTS

| 1437312 | 3/1966 | France | 174/65 R |
| 27411 | of 1898 | United Kingdom | 285/156 |
| 1035543 | 7/1966 | United Kingdom | 285/177 |
| 1172404 | 11/1969 | United Kingdom | 285/177 |

Primary Examiner—Dave W. Arola
Attorney, Agent, or Firm—John M. Harrison

[57] ABSTRACT

Universal fittings are each characterized by at least one connecting port having stepped internal sleeves of decreasing diameter for receiving and joining or capping plastic or metal pipe of various corresponding diameter. The universal fittings are each capable of connecting or capping pipe of varying outside diameter and are designed to reduce the number of conventional fittings which are currently necessary to join pipe in conventional fashion. A single universal fitting can be used to connect or cap pipe of the same or different diameter by inserting the end of the pipe into one of several internal sleeves which corresponds to or is slightly larger than the outside diameter of the pipe. Universal fittings which are provided according to this invention include elbows, tees, reducers, end caps and couplings, in nonexclusive particular.

2 Claims, 17 Drawing Figures

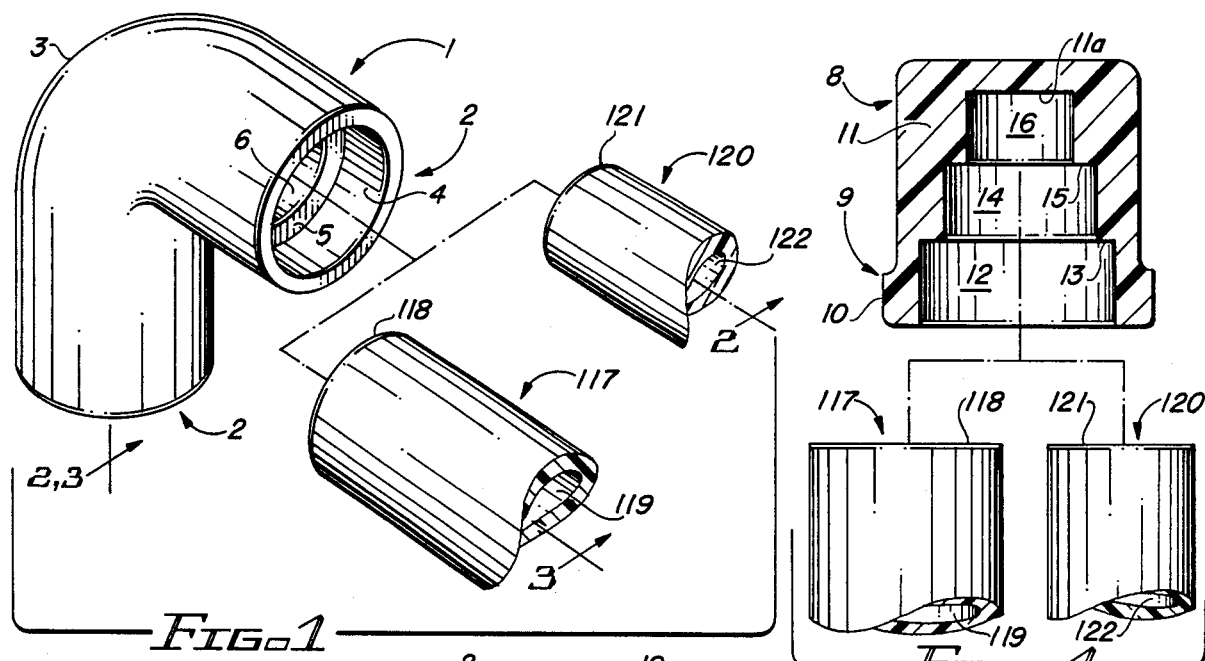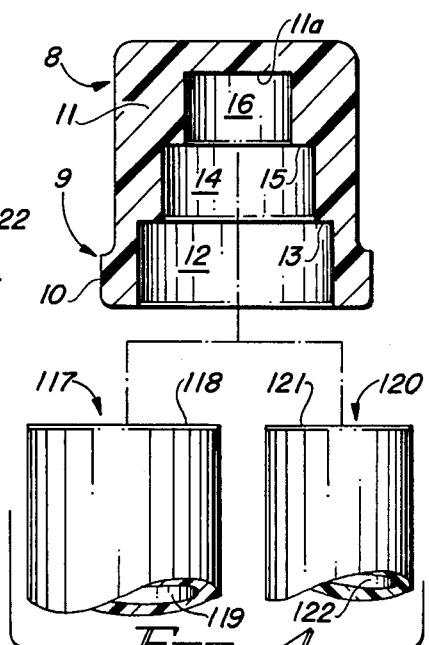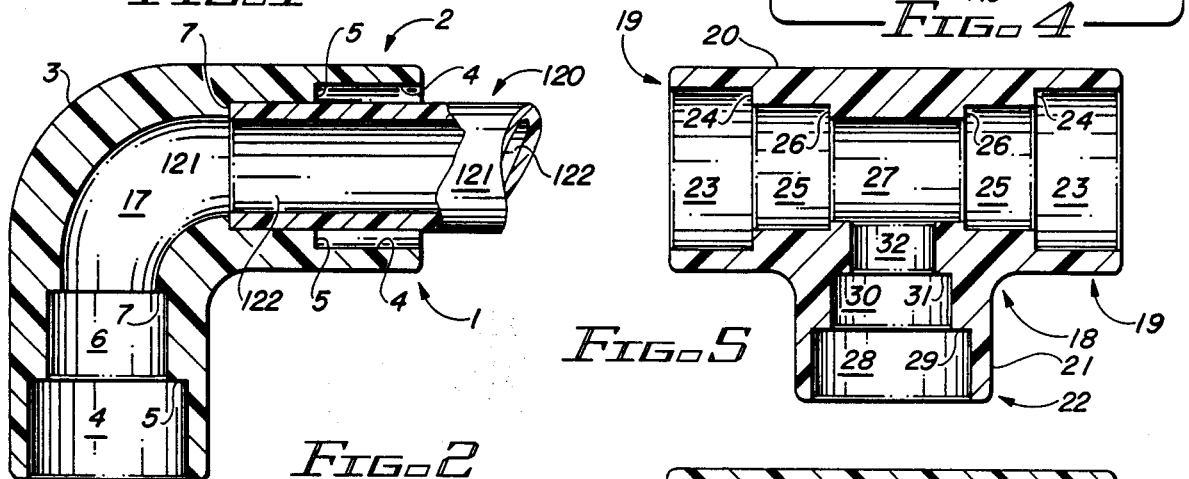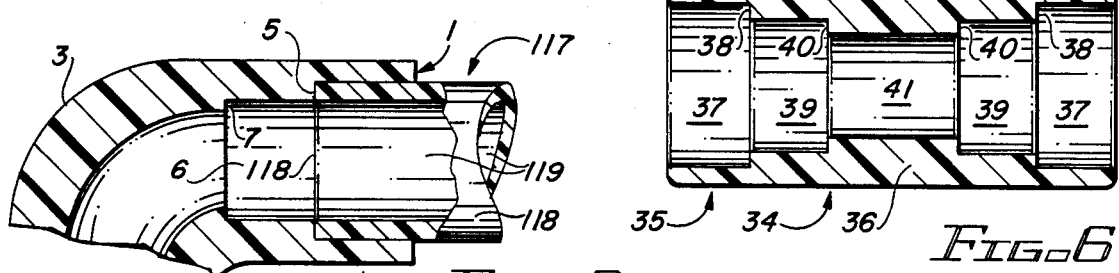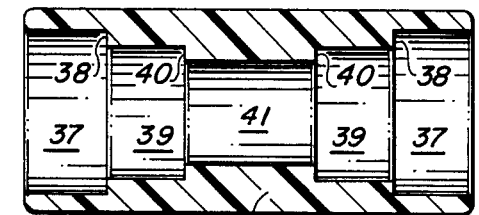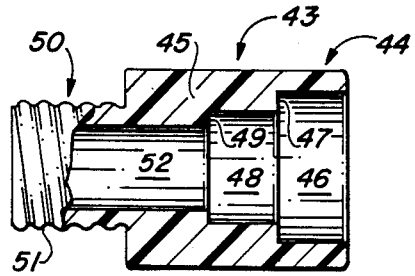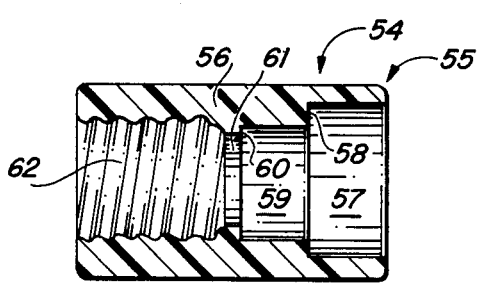

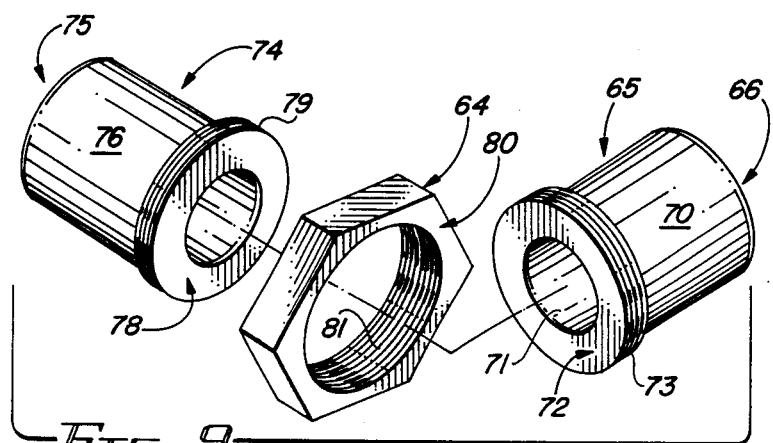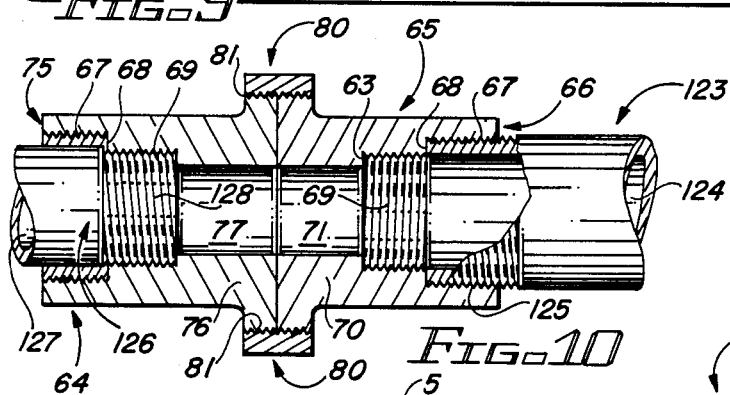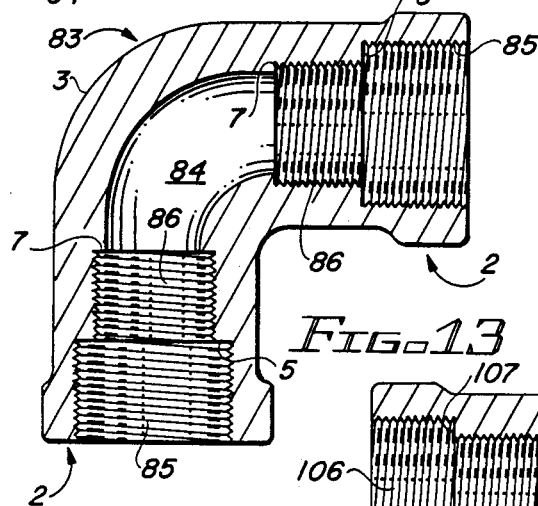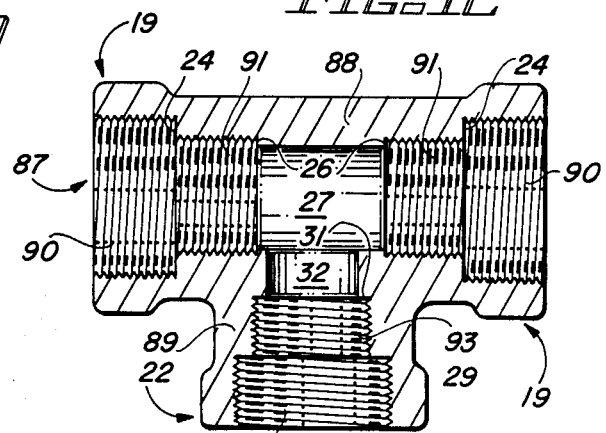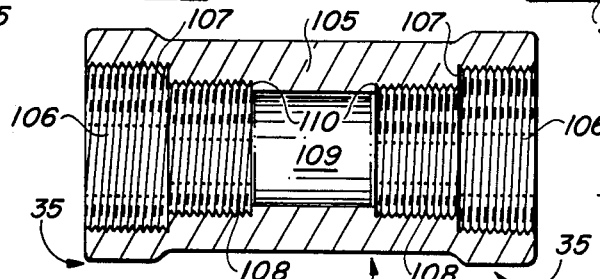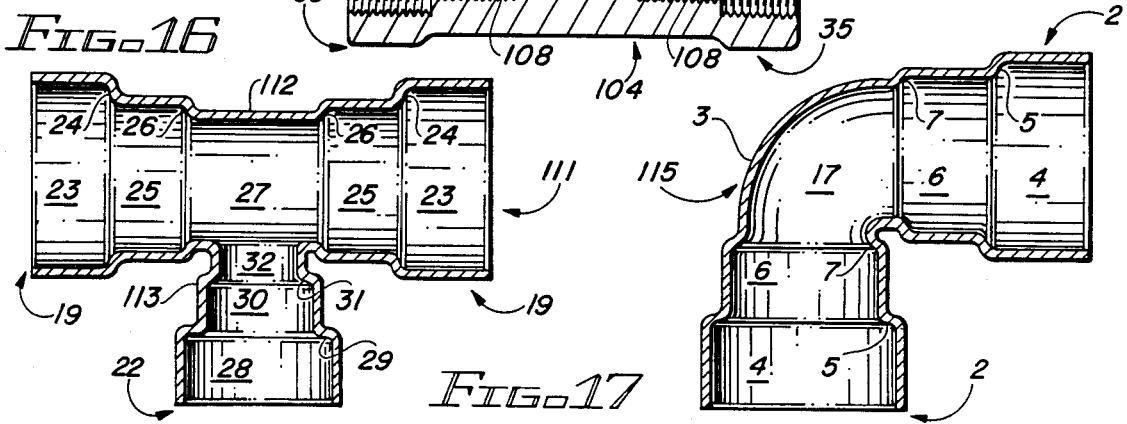

UNIVERSAL FITTINGS

BACKGROUND OF THE INVENTION

Field of the Invention

This invention relates to fittings for pipes and more particularly, to universal fittings for connecting and capping both plastic and metal pipe in a wide variety of connecting and capping functions. The invention is characterized by universal fittings including elbows, tees, reducers, caps and couplings such as unions and adaptors, in non-exclusive particular, each of which fittings is designed to accommodate and join or cap pipe of varying diameter in order to reduce the need for multiple conventional fittings which are required in conventional piping systems. Each of the universal fittings of this invention is characterized by at least one connecting port which is internally "stepped" and configured to provide internal sleeves of successively decreasing diameter, in order to receive and connect or cap pipe of various diameter. Accordingly, a single universal fitting can be utilized to join or cap pipe of various diameter without the necessity of providing multiple conventional fittings, each of which conventional fittings is designed to accommodate a pipe of one specific diameter only. Certain universal fittings of this invention are typically configured to receive two pipes of various diameter but may, in a preferred embodiment of the invention, be configured to receive more than two such pipe sizes.

One of the problems realized in the fabrication of pipelines and piping configurations of various description such as water lines and the like, is that of providing multiple fittings which are necessary to extend the lines across uneven terrain or in a trench or structure such as an office building or residence. Multiple conventional fittings must be provided to extend the piping across such terrain or through a structure, with multiple connectors such as elbows, tees, unions and reducing connectors frequently necessary in order to complete the piping system. A large supply of fittings must be provided for each such project, since in conventional plastic and metal piping systems a single fitting of specified size must be used in cooperation with companion piping of the same corresponding size.

Various types of adaptors and fittings are known in the art. U.S. Pat. No. 2,914,332, dated Nov. 24, 1959, to W. A. Cervini, discloses a "Drill Adaptor". The Cervini drill adaptor is designed to accommodate drill bits of different sizes which are larger than the maximum chuck opening of the drill, without altering the drill bit shank. The drill bit adaptor is provided with multiple, stepped internal diameters of various size and allen screws are provided in the housing of the drill adaptor at each diameter step in order to secure a drill bit of corresponding size in the adaptor. U.S. Pat. No. 3,817,561, dated June 18, 1974, to Francis Kay, discloses a "Pipe Joint Connector". The pipe joint connector detailed in this patent includes a connector body having an orifice which is sized to receive a pipe to be connected thereto. Two or more sharp-edged ribs are provided internally of the connector body, each of which ribs is interrupted to provide a ring of teeth and the entry face of each rib also being ramped and extending from a diameter at the rib edge. This diameter is less than the nominal external diameter of the pipe and extends to a diameter greater than the nominal external diameter of the pipe. The body of the connector may have two or more pairs or sets of ribs which are sized to receive and engage pipes of respectively different nominal external diameter. A "Refrigerant Line Connecting Tee With Step Diameter Bushing" is disclosed in U.S. Pat. No. 3,997,140, dated Dec. 14, 1976, to John W. Mullins. This device is characterized by an elongated body which is provided with a transverse bore for receiving a sleeve having end portions adapted for connection with lines of selected size and forming a passageway. An axial threaded bore provided in one end of the body communicates with the transverse bore. The sleeve is provided with a wall aperture which communicates with the threaded bore and seals with a tip end valve housing which is threadably engaged with the axial bore, to provide communication between the sleeve passageway and the bore of the housing. U.S. Pat. No. 4,457,542, dated July 3, 1984, to Robert R. Schaefer, et, al., discloses a "Plastic Pipe Fitting". The plastic pipe fitting includes an inner one-piece liner which is constructed of a thermoplastic material. The liner is formed so as to include at least one cylindrical leg having a free outer end and an inner end disposed intermediate the opposite ends of the liner. At least one pipe section is formed, which includes an inner thermoplastic lining and a fiber-reinforced outer layer. This pipe section is bonded to an outer surface of the cylindrical leg such that an inner end edge of the pipe section overlies the liner. A sheet of fiber-reinforced, thermosetting resin molding compound is applied externally around the inner end edge of the pipe section and is subjected to pressure and heat to form the sheet into a desired shape. Thereafter, the sheet is allowed to harden. Elements which may be formed in this manner include a tee fitting, a pipe flange, a 90° fitting, a reducer fitting, a 45° fitting and a pipe cap.

It is an object of this invention to provide new and improved end caps, adapters and fittings which are constructed with at least one connecting port having stepped receiving sleeves of successively smaller diameter for connecting and capping pipes of respectively different and corresponding nominal external diameter.

Another object of this invention is to provide universal fittings which are characterized by multiple, stepped internal sleeves of different diameter for connecting and capping plastic and metal pipe of dissimilar size and corresponding diameter.

Yet another object of the invention is to provide new and improved universal fittings, including elbows, tees, reducers, end caps and couplings which are each characterized by at least one connecting port having at least two smooth or threaded connecting sleeves of successively smaller diameter for connecting and capping plastic and metal pipe of respectively different nominal external diameter.

Another object of the invention is to provide plastic and metal universal fittings for connecting both plastic and metal piping of the same or different diameter, which universal fittings are each characterized by connecting ports having multiple internal sleeves of corresponding diameter for receiving and connecting or capping the piping.

SUMMARY OF THE INVENTION

These and other objects of this invention are provided in universal fittings which include, in non-exclusive particular, elbows, tees, reducers, end caps and couplings such as unions and reducing connectors, each of which fittings have at least one connecting port provided with at least two threaded and/or smooth internal connector sleeves of successively smaller diameter for receiving and joining two lengths of pipe of the same or respectively different nominal external diameter.

BRIEF DESCRIPTION OF THE DRAWINGS

The invention will be better understood by reference to the accompanying drawings, wherein:

FIG. 1 is a perspective view of a non-threaded elbow universal fitting and conventional connecting piping of different diameter according to this invention;

FIG. 2 is a sectional view of the elbow and connecting piping of smaller diameter, taken along line 2—2 in FIG. 1;

FIG. 3 is a sectional view of the elbow and connecting piping of larger diameter taken along lines 3—3 in FIG. 1;

FIG. 4 is a sectional view of a non-threaded end cap universal fitting and conventional connecting piping of different diameter according to this invention;

FIG. 5 is a longitudinal sectional view of a non-threaded tee universal fitting;

FIG. 6 is a longitudinal sectional view of a non-threaded, non-reducing connector universal fitting;

FIG. 7 is a longitudinal sectional view of an externally threaded or male universal fitting;

FIG. 8 is a longitudinal sectional view of an internally threaded, or female universal fitting;

FIG. 9 is a perspective view of a union universal fitting;

FIG. 10 is a longitudinal sectional view of the union universal fitting illustrated in FIG. 9, with conventional connecting piping of different size threadibly attached thereto;

FIG. 11 is a longitudinal sectional view of an internally threaded end cap universal fitting;

FIG. 12 is a longitudinal sectional view of a stamped end cap universal fitting;

FIG. 13 is a longitudinal sectional view of an internally threaded elbow universal fitting;

FIG. 14 is a longitudinal sectional view of an internally threaded tee universal fitting;

FIG. 15 is a longitudinal sectional view of a threaded, non-reducing coupling universal fitting;

FIG. 16 is a longitudinal sectional view of a stamped tee universal fitting; and FIG. 17 is a longitudinal sectional view of a stamped elbow universal fitting.

DESCRIPTION OF THE PREFERRED EMBODIMENTS

Referring initially to FIGS. 1-3 of the drawings the universal fittings of this invention are first characterized by an elbow fitting generally illustrated by reference numeral 1. The elbow fitting 1 includes a pair of elbow connecting ports 2 disposed in 90° relationship with respect to each other and integrally connected at an elbow bend 3. A smooth, axial outer elbow sleeve 4 is provided immediately inside each of the elbow connecting ports 2 and an outer elbow sleeve step 5 is molded or otherwise provided in each of the elbow connecting ports 2 to define inner margins for the outer elbow sleeve 4. A smooth inner elbow sleeve 6 having a smaller diameter than the outer elbow sleeve 4, extends inwardly of each of the elbow connecting ports 2 from the outer elbow sleeve steps 5 and terminates at the inner elbow sleeve steps 7, which define the inside margins of the inner elbow sleeves 6. The inner elbow sleeve steps 7 also define both ends of the elbow fitting bore 17, which is provided in the interior of the elbow fitting 1 and communicates with the inner elbow sleeves 6 and the outer elbow sleeves 4, as illustrated. Accordingly, as illustrated in FIG. 2 of the drawings, the small pipe end 121 of a small pipe 120 having a small pipe bore 122, is inserted in one of the elbow connecting ports 2 such that the small pipe end 121 seats against the companion inner elbow sleeve step 7 and is tightly secured inside the inner elbow sleeve 6. The small pipe end 121 of the small pipe 120 can be permanently secured to the elbow fitting 1 by using a suitable cement, particularly under circumstances where the small pipe 120 and the elbow fitting 1 are molded or shaped of plastic, such as the well known low temperature PVC and high temperature CPVC plastic materials. Referring to FIG. 3 of the drawings, the large pipe end 118 of a large pipe 117 having a large pipe bore 119, can be inserted in one of the elbow connecting ports 2 such that the large pipe end 118 is seated against the companion outer elbow sleeve step 5 and the large pipe end 118 tightly engages the outer elbow sleeve 4. As in the case of the small pipe 120-to-elbow fitting 1 connection, the large pipe 117-to-elbow fitting 1 connection can be effected by a suitable cement or by other techniques known to those skilled in the art. It will also be appreciated from a consideration of FIGS. 1-3 of the drawings that the large pipe 117 can be seated in the outer elbow sleeve 4 of one of the elbow connecting ports 2, while the small pipe 120 is seated in the inner elbow sleeve 6 of the companion elbow connecting port 2, in a single elbow fitting 1, to connect pipes of different diameter.

Referring now to FIG. 4 of the drawing, in another preferred embodiment of the invention a molded cap fitting is generally illustrated by reference numeral 8 and is characterized by a cap connecting port 9, having a port flange 10 which is molded in the cap body 11. In a most preferred embodiment the molded cap fitting 8 is molded from a thermoplastic or thermoresin material such as PVC or CPVC, which is well known to those skilled in the art. The cap connecting port 9 of the molded cap fitting 8 is provided with a smooth interior outer cap sleeve 12 which extends to an outer cap step 13. A smaller, smooth middle cap sleeve 14 extends inwardly of the cap body 11 from the outer cap step 13 and is terminated by a middle cap step 15, as illustrated. A yet smaller smooth inner cap sleeve 16 projects further inwardly of the cap body 11 from the middle cap step 15 and terminates at a cap end 11a. Accordingly, it will be appreciated that the large pipe end 118 of the large pipe 117 can be inserted in the cap connecting port 9 of the molded cap fitting 8 and tightly seated in the outer cap sleeve 12 against the outer cap step 13. Alternatively, the small pipe end 121 of a small pipe 120 having a smaller diameter can be inserted in the cap connecting port 9 and tightly seated in the middle cap sleeve 14 against the middle cap step 15, to secure the molded cap fitting 8 tightly on the small pipe 120. A suitable cement or other technique such as hot air welding, can be used according to the knowledge of those skilled in the art to seal the molded cap fitting 8 on the large pipe 117 or the small pipe 120.

Referring now to FIG. 5 of the drawings, a tee fitting is generally illustrated by reference numeral 18 and includes a pair of tee connecting ports 19 disposed at opposite ends of a tee run 20, with a tee leg 21 projecting from the center of the tee run 20, as illustrated. The tee leg 21 is further provided with a leg connecting port 22, such that the tee fitting 18 can be used to join three pieces of pipe having different diameters, as hereinafter described. A pair of smooth outer run sleeves 23 are provided immediately inside the tee connecting ports 19, respectively, and are each terminated by an outer run step 24. A pair of smaller, smooth inner run sleeves 25 extend inwardly of the tee run 20 towards each other from the outer run steps 24, respectively, and are terminated by a pair of inner run steps 26, as illustrated. Both the outer run sleeves 23 and the inner run sleeves 25 communicate with a run bore 27, provided in the interior of the tee run 20. A smooth outer leg sleeve 28 is provided immediately inside the leg connecting port 22 of the tee leg 21 and extends inwardly of the tee leg 21 to an outer leg step 29. A smaller inner leg sleeve 30 projects further inwardly of the tee leg 21 to an inner leg step 31, the outer diameter of which inner leg step 21 defines a leg bore 32, which communicates with the run bore 27 of the tee run 20. It will be appreciated by those skilled in the art that pipe of varying diameter can be connected by using the tee fitting 18 without the necessity of providing multiple conventional tees to perform the connections. For example, referring again to FIGS. 2, 3 and 5, both the large pipe end 118 of the large pipe 117 and the small pipe end 121 of the small pipe 120 can be inserted in the outer run sleeves 23 and the inner run sleeves 25 of the tee run 20, respectively, and another pipe (not illustrated) of selected size can be inserted in the outer leg sleeve 28 or the inner leg sleeve 30 of the tee leg 21, respectively, in order to connect such piping.

Referring now to FIG. 6 of the drawings, a connector fitting is generally illustrated by reference numeral 34 and is characterized by a pair of connector ports 35 provided at each end of a connector body 36. Each of the connector ports 35 is fitted with a smooth outer connector sleeve 37, which extends inwardly of the connector body 36 and is terminated by an outer connector sleeve step 38. Smaller, smooth inner connector sleeves 39 extend further inwardly of the connector body 36 toward each other from the outer connector sleeve steps 38, respectively, and are each terminated by an inner connector sleeve step 40, as illustrated. The inner connector sleeve step 40 defines each end of a connector fitting bore 41, which communicates with the outer connector sleeves 37 and the inner connector sleeves 39, as illustrated. Accordingly, it will be appreciated from a consideration of FIGS. 2, 3 and 6 that the connector fitting 34 can be used to connect both a large pipe 117 and small pipe 120, or sections of either of these pipes, according to the knowledge of those skilled in the art and as heretofore described.

Referring to FIG. 7 of the drawings, a male connector fitting 43 is illustrated and is provided with a male connecting port 44, which is shaped into one end of the male connector body 45. A male connector nipple 50 is provided at the opposite end of the male connector body 45 and the male connector nipple 50 is provided with nipple threads 51, as illustrated. A smooth outer male sleeve 46 is provided inside the male connecting port 44 and extends to an outer male step 47. A smaller, smooth inner male sleeve 48 extends further inwardly of the male connector body 45 and is terminated by an inner male step 49, which also terminates the male connector bore 52, extending through the male connector body 45. The male connector bore 52 also extends through the male connector nipple 50 and it will be appreciated that the male connector nipple 50 can be threadably inserted into another fitting or into a conventional internally-threaded length of pipe (not illustrated) in order to attach the male connector fitting 43 to such a pipe. Furthermore, as illustrated in FIGS. 2, 3 and 7 of the drawings, either the large pipe end 118 of the large pipe 117 or the small pipe end 121 of the small pipe 120 can be inserted in the male connecting port 44 as heretofore described, in order to join the large pipe 117 or small pipe 120 to another internallly threaded pipe, which can be attached to the male connector nipple 50 of the male connector fitting 43.

Referring to FIG. 8 of the drawings a female connector fitting is generally illustrated by reference numeral 54 and is provided with a female connector body 56, having a female connecting port 55 at one end and internal female connector threads 62 communicating with the short female connector bore 61, as illustrated. A smooth outer female sleeve 57 is provided immediately inside the female connecting port 55 and is terminated by an outer female step 58. A smaller, smooth inner female sleeve 59 extends from the outer female step 58 and is terminated by an inner female step 60, which also communicates with the female connector bore 61. Accordingly, referring again to FIGS. 2, 3 and 8 of the drawings, either the large pipe end 118 of the large pipe 117 or the small pipe end 121 of the small pipe 120 can be inserted in the female connecting port 55 of the female connector fitting 54 and secured in the outer female sleeve 57 or the inner female sleeve 59, respectively. Furthermore, a second length of pipe having external threads thereon (not illustrated) or another fitting such as the male connector fitting 43, having a male connector nipple 50 which is provided with external nipple threads 51, can be threadably connected to the female connector threads 62 of the female connector 54, in order to join two lengths of pipe of the same or different diameter, according to the knowledge of those skilled in the art.

Referring now to FIGS. 9 and 10 of the drawings, a union fitting is generally illustrated by reference numeral 64 and is characterized by a cylindrically-shaped first run 65 and second run 74, which are connected by a connecting nut 80. The first run 65 is characterized by a first run connecting port 66 provided with outer port threads 67 which are terminated by an outer port step 68, as illustrated in FIG. 10. A set of smaller inner port threads 69 project further inwardly of the first run 65 from the outer port step 68 and terminate at an inner port step 63, which further defines one end of the first run bore 71, extending through the first run body 70 and communicates with the outer port threads 67 and the inner port threads 69. A first run flange 72 is provided on the end of the first run body 70 opposite the first run 65 and is fitted with external first run flange threads 73, as illustrated. A second run connecting port 75 is provided on one end of the second run 74 and a second run bore 77 extends through the second run body 76, as in the case of the first run 65. Furthermore, an additional set of outer port threads 67 are provided inside the second run connecting port 75 and terminate at an outer port step 68. A smaller set of inner port threads 69 extend from the outer port step 68 to the inner port step 63, which also defines one end of the second run bore 77, as illustrated. An external second run flange 78 is provided on the second run body 76 opposite the second run connecting port 75 and is fitted with second run flange threads 79, as illustrated. The connecting nut 80 is provided with internal nut threads 81, which are designed to engage the first run flange threads 73 and the second run flange threads 79 and join the first run flange 72 of the first run 65 to the second run flange 78 of the second run 74, as illustrated in FIG. 10. Accordingly, as further illustrated in FIG. 10, a large threaded pipe 123, having a large threaded pipe bore 124 and large pipe threads 125, is inserted in the first run connector port 66 of the first run 65 to engage the outer port threads 67. Furthermore, a small threaded pipe 126, having a small threaded pipe bore 127 and small pipe threads 128, is inserted in the second run connector port 75, with the small pipe threads 128 threadably engaging the inner threads 69 in the second run connecting port 75. The union fitting 64 is therefore operable to connect the large threaded pipe 123 to the small threaded pipe 126.

Referring now to FIG. 11 of the drawings, a threaded cap fitting is generally illustrated by reference numeral 94 and is characterized by a threaded cap body 95, having a threaded cap connecting port 96 provided in one end thereof. Outer cap threads 97 are provided in the threaded cap connecting port 96 and are terminated by an outer cap step 13, as illustrated. A smaller set of middle cap threads 98 extend from the outer cap step 13 inwardly of the threaded cap body 95 and terminate at a middle cap step 15. A yet smaller set of inner cap threads 99 extend even further inwardly of the threaded cap body 95 and terminate at a cap end 11a, such that the threaded cap body 95 of the threaded cap fitting 94 is provided with three sets of successively smaller outer cap threads 97, middle cap threads 98 and inner cap threads 99, respectively. It will be appreciated by those skilled in the art that externally threaded pipe of various diameter, such as the large threaded pipe 123 and small threaded pipe 126 illustrated in FIG. 10, can be inserted in the threaded cap connecting port 96 to engage either the outer cap threads 97, middle cap threads 98, or inner cap threads 99 of corresponding diameter, respectively, in order to secure the pipe to the threaded cap fitting 94 and cap the pipe, as desired.

Referring to FIG. 12 of the drawing in yet another preferred embodiment of the invention a stamped cap fitting 100 is generally illustrated and is defined by the stamped cap body 101. The stamped cap body 101 is typically stamped in copper or other malleable metal by techniques well known to those skilled in the art and includes a stamped cap connecting port 102 located opposite a smaller cap end 103. A smooth outer cap sleeve 12 is shped immediately inside the stamped cap connecting port 102 and is terminated by an outer cap step 13, as illustrated. A smaller, smooth middle cap sleeve 14 extends from the outer cap step 13 and terminates at a middle cap step 15. A smooth inner cap sleeve 16 of still smaller diameter projects from the middle cap step 15 and extends to the cap end 103. It will be appreciated by those skilled in the art that copper pipe or other pipe of various diameter can be inserted in the stamped cap connecting port 102 and fitted in registration with the outer cap sleeve 12, middle cap sleeve 14 or inner cap sleeve 16, respectively, according to the diameter of the pipe. Solder can then be used to secure the pipe inside the stamped cap fitting 100.

Referring to FIG. 14 of the drawings, a threaded tee fitting is generally illustrated by reference numeral 87 and is characterized by a threaded tee run 88, provided with oppositely-disposed tee connecting ports 19 on each end and outer run sleeve threads 90 located inside each of the tee connecting ports 19, respectively. The outer run sleeve threads 90 are terminated by a pair of outer run steps 24 and smaller sets of inner run sleeve threads 91 extend inwardly from the outer run steps 24, respectively, and terminate at the inner run steps 26. A run bore 27 is provided internally of the threaded tee run 88 and communicates with the outer run sleeve threads 90 and the inner run sleeve threads 91, respectively. A threaded tee leg 89 projects from the center portion of the threaded tee run 88 and is characterized by a leg connecting port 22, which incorporates a set of outer leg threads 92 therein. The outer leg threads 92 terminate at an outer leg step 29 and a smaller set of inner leg threads 93 extend from the outer leg step 29 further inwardly of the threaded tee leg 89 and terminate at an inner leg step 31. The inner leg step 31 defines the leg bore 32, which communicates with the run bore 27 provided in the threaded tee run 88.

Referring now to FIG. 13 of the drawings in another preferred embodiment of the invention a threaded elbow fitting is generally illustrated by reference numeral 83 and is characterized by a pair of elbow connecting ports 2, disposed in 90° relationship with respect to each other and joined at a curved elbow bend 3. Outer elbow sleeve threads 85 are provided in each of the elbow connecting ports 2 and are each terminated by an outer elbow sleeve stop 5, as illustrated. Smaller sets of inner elbow sleeve threads 86 extend from the outer elbow sleeve steps 5 inwardly of the threaded elbow fitting 83, respectively, and are each terminated by an inner elbow sleeve stop 7. The inner elbow sleeve stops 7 define a curved threaded elbow bore 84, which communicates with the outer elbow sleeve threads 85 and the inner elbow sleeve threads 86, as illustrated.

Referring to FIG. 15 of the drawings, in yet another preferred embodiment of the invention a threaded connector fitting is generally illustrated by reference numeral 104 and is characterized by a threaded connector body 105, provided with a pair of connector ports 35 at each end and having outer connector threads 106 provided in each of the connector ports 35. The outer connector threads 106 are each terminated by an outer connector step 107 and a set of inner connector threads 108 extend from each of the outer connector steps 107 inwardly of the threaded connector body 105 toward each other and terminate at a pair of inner connector steps 110, respectively. A threaded connector bore 109 extends inside the threaded connector body 105 between the inner connector steps 110 and the threaded connector bore 109 communicates with both sets of outer connector threads 106 and inner connector threads 108, respectively. Accordingly, it will be appreciated that threaded pipes of various diameter, such as the large threaded pipe 123 and small threaded pipe 126 illustrated in FIG. 10, can be threadably attached to the threaded connector fitting 104 by inserting the threaded ends in the connector ports 35 for threadable attachment to either the outer connector threads 106 or the inner connector threads 108.

Referring to FIG. 16 of the drawings in a still further preferred embodiment of the invention a stamped tee fitting 111 is illustrated and is characterized by a stamped run 112, from which a stamped leg 113 projects. The stamped run 112 is provided with a pair of oppositely-disposed tee connecting ports 19, each of which tee connecting ports 19 is characterized by a smooth outer run sleeve 23 terminated by an outer run step 24. A pair of smaller, smooth inner run sleeves 25 extend inwardly toward each other from the outer run steps 24, respectively, and terminate at inner run steps 26, which lie adjacent the run bore 27. The run bore 27 communicates with both sets of outer run sleeves 23 and inner run sleeves 25, respectively. A leg connecting port 22 is provided in the extending end of the stamped leg 113 and includes a smooth outer leg sleeve 28, which extends to an outer leg step 29. A smaller, smooth inner leg sleeve 30 projects toward the run bore 27 from the outer leg step 29 and terminates at an inner leg step 31, as illustrated. A leg bore 32 extends from the run bore 27 to the outer leg sleeve 28 and inner leg sleeve 30, as illustrated. It will be appreciated that the stamped tee fitting 111 can be stamped or shaped from copper or other malleable metal and that pipe of various diameter can be inserted in the tee connecting ports 19 and the leg connecting port 22 to join the pipe by soldering, welding or other techniques, according to the knowledge of those skilled in the art.

Referring to FIG. 17 of the drawing in yet another preferred embodiment of the invention a stamped elbow fitting is generally designated by reference numeral 115 and is provided with elbow connecting ports 2, disposed in 90° relationship with respect to each other and separated by an elbow bend 3. A smooth outer elbow sleeve 4 is provided in each of the elbow connecting ports 2 and extend to a pair of outer elbow sleeve stops 5, respectively. Smooth elbow sleeves 6 of smaller diameter extend further inwardly of the stamped elbow fitting 115 to a pair of inner elbow sleeve steps 7, as illustrated. The elbow fitting bore 17 communicates with both the outer elbow sleeves 4 and the inner elbow sleeves 6, as illustrated. As in the case of the stamped tee fitting 111, pipe of various diameter can be joined by inserting the pipe in the respective elbow connecting ports 2 and securing the pipe to either the outer elbow sleeve 4 or the inner elbow sleeve 6, depending upon the pipe diameter.

Referring again to the drawings, while the elbow fitting 1, tee fitting 18, threaded elbow fitting 83, threaded tee fitting 87, stamped tee fitting 11 and stamped elbow fitting 115 disclose connecting ports which are disposed in 90 degree relationship, it is understood that connecting ports which are disposed in other angular variations such as 30, 45 and 60 degrees with respect to each other, can also be provided according to the teachings of this invention. Furthermore, each of the universal fittings disclosed herein can be constructed with sleeve steps that correspond to the wall thickness of the pipe to which they are joined, in order to minimize presure drop through a piping system which utilizes the universal fittings of this invention. For example, referring again to FIG. 2 of the drawings the thickness of the inner elbow sleeve stop 7 corresponds to the wall thickness of the small pipe 120. This facility streamlines the flow of fluid through the elbow fitting 1, since the small pipe bore 122 is substantially coextensive with the elbow fitting bore 17 when the small pipe 120 is secured to the inner elbow sleeve 6, as illustrated. A similar streamlining effect is produced when the large pipe 117 is inserted in the outer elbow sleeve 4 of the elbow fitting 1, as illustrated in FIG. 3.

It will be further appreciated that the various universal fittings of this invention can be manufactured of a wide variety of materials, including thermoplastic and thermoresin materials such as polyvinyl chloride (PVC) and CPVC, as well as metal, according to the knowledge of those skilled in the art. Accordingly, each of the fittings can be fabricated of PVC or CPVC or an alternative suitable plastic material for use in such service as water lines, gas lines and the like. Furthermore, the fittings can also be cast, stamped, extruded or otherwise manufactured from metals such as aluminum, copper and iron for gas and water service, as well as other service, also according to the knowledge of those skilled in the art.

It will also be appreciated that the respective sleeves provided in the connecting ports of the universal fittings herein can be threaded or smooth in any combination within any of the fittings, in order to utilize a single fitting to connect both smooth and threaded pipe, if desired. For example, referring again to the drawings it will be further appreciated by those skilled in the art that while the elbow fitting 1, tee fitting 18, connector fitting 34, male connector fitting 43, female connecting fitting 54, union fitting 64, threaded elbow fitting 83, threaded tee fitting 87, threaded connector fitting 104 and stamped elbow fitting 115 are disclosed and described with respect to a smooth outer sleeve and inner sleeve or an outer set of threads and inner set of threads of different diameter, as the case may be, both smooth sleeves and threaded sleeves can be provided in any desired combination in such fittings, depending upon the requirements of the user. It will be further appreciated by those skilled in the art that the provision of additional sleeves or threads of various diameter in the respective universal fittings further reduces the number of fittings that are required for any particular piping job to be accomplished. Accordingly, the versatility of the universal fittings is limited only by the size of the fittings to be produced, since the provision of additional sleeves necessitates a larger fitting.

The universal fittings of this invention are characterized by convenience and flexibility, in that comparatively few of these fittings are required for a particular construction application in order to complete the required piping system. The universal fittings not only eliminate the need for multiple conventional fittings, but they also save time and expense, both in material and labor.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A universal union fitting for attachment to threaded and unthreaded pipes having different diameters, said universal fitting comprising a first body portion and a first central bore provided in said first body portion; at least two axial first sleeves having successively decreasing diameters provided in stepped relationship in one end of said first body portion, said first sleeves communicating with said first central bore; a first flange provided on the opposite end of said first body portion from said first sleeves and first threads provided on said first flange; a second body portion and a second central bore provided in said second body portion; at least two axial second sleeves having different diameters provided in stepped relationship in one end of said second body portion, said second sleeves communicating with said second central bore; a second flange provided on the opposite end of said second body from said second sleeves and second threads provided on said second flange; and a threaded nut disposed between said first body portion and said second body portion for engaging said first threads and said second threads and removably joining said first body portion to said second body portion.

2. The universal union fitting of claim 1 further comprising first sleeve threads provided in said first sleeves and second sleeve threads provided in said second sleeves for threadible attachment of said first body portion and said second body portion to externally threaded lengths of the pipes.

* * * * *